Figure 1:
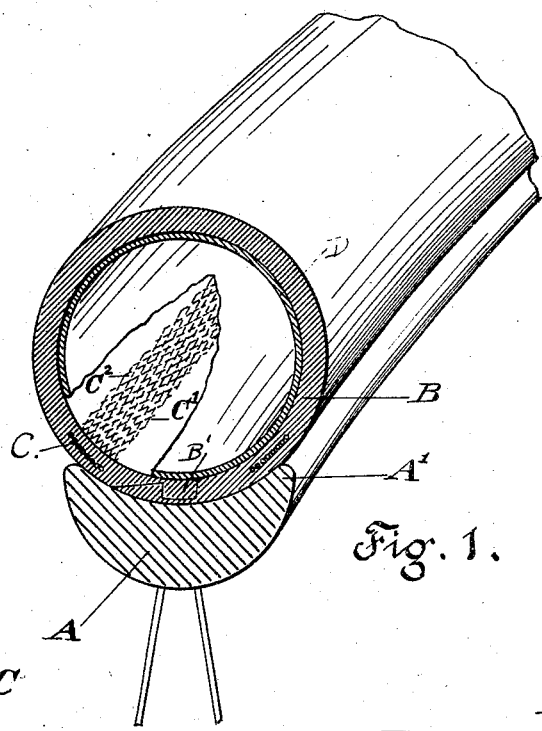

No. 608,273. Patented Aug. 2, 1898.
C. S. SCOTT.
PNEUMATIC TIRE.
(Application filed Feb. 18, 1897.)

(No Model.)

Witnesses:
Charles Lowns
Adam Burt

Inventor
Charles S. Scott
By
Robert P. Scott
Atty.

UNITED STATES PATENT OFFICE.

CHARLES S. SCOTT, OF CADIZ, OHIO, ASSIGNOR OF THREE-FOURTHS TO ROBERT P. SCOTT AND HERMAN A. ROGERS, OF SAME PLACE.

PNEUMATIC TIRE.

SPECIFICATION forming part of Letters Patent No. 608,273, dated August 2, 1898.

Application filed February 18, 1897. Serial No. 624,013. (No model.)

*To all whom it may concern:*

Be it known that I, CHARLES S. SCOTT, a citizen of the United States, residing at Cadiz, Harrison county, Ohio, have invented a new and useful Improvement in Pneumatic Tires, of which the following is a specification.

The object of my invention is to produce a pneumatic tire which is automatically attached by the act of inflation, which is easy of manipulation, which is perfectly flexible when uninflated and free from incumbrance with stiff and unyielding wires, which is firmly held to the rim and yet has no tendency to split wood rims, in which the forces brought into play by rolling are such as to balance each other and result in no tendency of creeping on the rim, which is held from a sidewise rolling off the rim, and which has sufficient compass to be applied to rims of differing sizes. To this end I secure to each side of the shoe of the tire, preferably by embedding therein, a band of shrinkable metal fabric, which is shown as diagonally-woven wire fabric. The inflation of the tire by forcing the band to assume the shape of the tire causes an extension of the upper or outer edges of these bands and a corresponding contraction of the lower or inner edges thereof, the band as a whole or circular structure assuming a frusto-conical shape closely conforming to the shape of the part of the inflated tire in which it lies and becoming substantially rigid edgewise. The contraction of the lower edges of the bands may cause them to grip to the rim by a radial contracting pressure, which would be in the direction of the wheel-spokes, and thus has no tendency to split the rims, as would be the case if the pressure were perpendicular to the spokes and wheel-rim. The extended outer edges of the bands also form a base-line against which the part of the tire between them and the rim can expand against the rim, thus still further securing the tire to the rim. Again, the distortion of the band into frusto-conical shape makes it rigid edgewise. This is due to the peculiar strain put upon the metal fabric due to its distorted shape. Being rigid edgewise the band cannot leave the rim without expanding as a whole into a circle larger than the wheel-rim. This, however, the air-pressure is not sufficient to effect. There is a somewhat curious feature connected with this part of my invention. It is known that if a pair of endless wires be secured to the tire below the wheel-rim there is a tendency to creep of the tire in one direction. I have discovered that a pair of endless wires secured to the tire above the wheel-rim causes a creeping of the tire in the opposite direction. I have furthermore discovered that in the tire of this application, in which the band edges are preferably one above and the other below the rim edge, these two opposite tendencies to creep balance each other, so that with my tire there is not only no creeping on the rim, but no tendency to creep.

It will be seen that the bands when made of diagonally-woven wire fabric do not interfere with the flexibility of the tire. In fact they can only be detected by close examination. It is also apparent that my invention may be applied to single-tube tires in which the air-holding casing is permanently secured to the tire-shoe or to double-tube tires in which these parts are separate and unattached.

Figure 3:
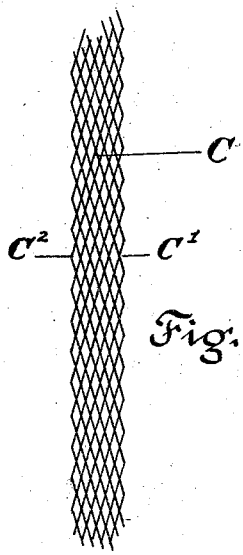
Figure 2:
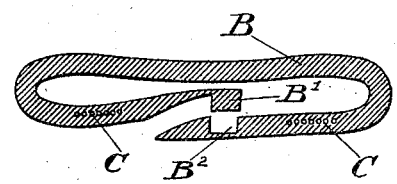

In the drawings, Figure 1 is a central section of the tire and rim; Fig. 2, a section of the tire-shoe, and Fig. 3 a plan of the band.

The shoe B is made of the usual materials— canvas coated with rubber. Secured thereto, preferably by embedding therein, are a pair of shrinkable bands, here shown as consisting of diagonally-woven wire fabric C, having selvages C' C². These bands are preferably so arranged in the shoe that their lower edges C' will come slightly below the upper edge A' of the grooved rim A and that their upper edges C² will come somewhat above the rim edge A'. The edges of the shoe are held together by means of securing devices, shown as the rib B', fitting in the groove B². The inner tube D is of the usual construction.

To place the tire upon the rim, the inner tube D is placed within the shoe B and the rib B' is pressed into the channel B². The structure is then slid upon the rim precisely as if it were a plain rubber tube which was to be cemented to the rim. The air-pump is then applied, and the expansion of the tire causes a distortion of the diagonally-woven fabric of the bands C, causing the meshes along the upper edges $C^2$ to stretch and the meshes along the lower edges $C'$ to contract, the whole assuming a frusto-conical form conforming to the shape of the tire, as before explained, and becoming quite rigid edgewise, owing to its distorted shape. The distortion of the meshes, elongated at $C^2$ and contracted at $C'$, cannot well be shown in the drawings. The lower edge $C'$ may grip the rim radially by its contraction, and the upper edge $C^2$ acts as a base against which the shoe between it and the rim is pressed radially against the rim, both of these actions being additive to hold the tire firmly on the rim. The rigidity of the distorted band is also effective for this purpose. On the other hand, the tendencies to creep caused by the edges $C'$ $C^2$, respectively, being in opposite directions neutralize each other. There is sufficient stretch in the fabric of the bands to admit of the use of the tire with rims of somewhat different sizes.

What I claim is—

1. An automatically-attachable pneumatic tire having primarily-flexible bands of diagonally-woven wire fabric secured in its sides, the inflation of the tire causing a distortion and consequent rigidity of the bands substantially as described.

2. The combination of a grooved wheel-rim and an automatically-attachable pneumatic tire having primarily-flexible metal bands secured in its sides, the edges of the bands being respectively above and below the rim edges and the inflation of the tire causing a distortion and consequent rigidity of the bands substantially as described.

3. The combination of a wheel-rim and an automatically-attachable pneumatic tire having a pair of primarily-flexible bands of diagonally-woven wire fabric in its sides, the inflation of the tire causing a distortion and consequent rigidity of the bands substantially as described.

CHARLES S. SCOTT.

Witnesses:
AARON THOMAS MOORE,
HERMAN A. ROGERS.